United States Patent
Ehring et al.

(10) Patent No.: US 12,529,651 B2
(45) Date of Patent: Jan. 20, 2026

(54) METHOD FOR CALIBRATING AN APPARATUS FOR MEASURING THE ABSORBANCE OF LIGHT BY A SUBSTANCE

(71) Applicant: CYTIVA SWEDEN AB, Uppsala (SE)

(72) Inventors: Hanno Ehring, Uppsala (SE); David Gronowitz, Uppsala (SE); Lars Rosengren, Uppsala (SE)

(73) Assignee: CYTIVA SWEDEN AB, Uppsala (SE)

( * ) Notice: Subject to any disclaimer, the term of this patent is extended or adjusted under 35 U.S.C. 154(b) by 455 days.

(21) Appl. No.: 17/996,581

(22) PCT Filed: Apr. 27, 2021

(86) PCT No.: PCT/EP2021/060951
§ 371 (c)(1),
(2) Date: Oct. 19, 2022

(87) PCT Pub. No.: WO2021/219616
PCT Pub. Date: Nov. 4, 2021

(65) Prior Publication Data
US 2023/0204495 A1   Jun. 29, 2023

(30) Foreign Application Priority Data
Apr. 29, 2020   (GB) ..................................... 2006311

(51) Int. Cl.
*G01N 21/27*   (2006.01)
*G01N 21/31*   (2006.01)
(Continued)

(52) U.S. Cl.
CPC ........... *G01N 21/274* (2013.01); *G01N 21/31* (2013.01); *G01N 21/85* (2013.01); *G01N 2030/626* (2013.01)

(58) Field of Classification Search
CPC ....... G01J 2003/2866; G01J 2003/2869; G01J 2003/2873; G01J 2003/2876;
(Continued)

(56) References Cited

U.S. PATENT DOCUMENTS 3,973,849 A * 8/1976 Jackson ................ G01J 3/2803
356/308
4,100,412 A   7/1978 Hausdorff
(Continued)

FOREIGN PATENT DOCUMENTS

CN   100561190 C * 11/2009
CN   102346069 A    2/2012
(Continued)

OTHER PUBLICATIONS

PCT International Search Report and Written Opinion for PCT/EP2021/060951, mailed, Jul. 9, 2021 (16 pages).
(Continued)

*Primary Examiner* — Gordon J Stock, Jr.
(74) *Attorney, Agent, or Firm* — Eversheds-Sutherland (US) LLP

(57) ABSTRACT

A computer implemented method performed by a computer configured to calibrate an apparatus for measuring the absorbance of light of a substance for a chromatography system, the apparatus comprising a conduit (C) for enabling a fluid to be measured, a light emitter (LE) configured to emit light along an optical path (OP) to a light sensor(S) configured to measure the emitted light, the optical path intersecting the conduit (C), a rotating disc (D) having one or more optical filters, each of the one or more optical filters is arranged with its center passing through the optical path (OP) when rotating, an actuator configured to rotate the disc (D) dependent on a control signal.

7 Claims, 8 Drawing Sheets

(51) Int. Cl.
*G01N 21/85* (2006.01)
*G01N 30/62* (2006.01)

(58) Field of Classification Search
CPC ....... G01J 2003/2879; G01J 2003/1295; G01J 2003/1278; G01J 3/0235; G01J 3/0202; G01J 3/46; G01J 3/52; G01J 3/522; G01J 3/524; G01J 3/023; G01J 1/20; G01J 1/22; G01J 1/24; G01J 1/26; G01J 2001/242; G01J 2001/245; G01J 2001/247; G01N 21/25; G01N 21/274; G01N 21/29; G01N 21/293; G01N 21/31; G01N 21/276; G01N 2021/3174; G01N 2021/317; G01N 2021/3177; G01N 2021/6471; G01N 2021/3133; G01N 2021/3137; G01N 30/62; G01N 30/74; G01N 2030/626

See application file for complete search history.

(56) References Cited

U.S. PATENT DOCUMENTS

| | | | | |
|---|---|---|---|---|
| 4,355,230 | A | 10/1982 | Wilson | |
| 4,396,288 | A * | 8/1983 | Helphrey | G01J 3/12 |
| | | | | 356/418 |
| 4,477,190 | A * | 10/1984 | Liston | G01N 21/253 |
| | | | | 356/418 |
| 4,657,398 | A * | 4/1987 | Brunsting | G01N 21/31 |
| | | | | 356/418 |
| 4,774,551 | A | 9/1988 | Amos | |
| 5,262,635 | A | 11/1993 | Curbelo | |
| 5,303,165 | A * | 4/1994 | Ganz | G01J 3/28 |
| | | | | 356/325 |
| 5,308,981 | A | 5/1994 | Perten | |
| 5,422,485 | A * | 6/1995 | Bowlds | G01N 21/3504 |
| | | | | 250/252.1 |
| 5,805,660 | A * | 9/1998 | Perion | G01V 5/22 |
| | | | | 378/53 |
| 6,110,522 | A * | 8/2000 | Lepper, Jr | G02B 26/008 |
| | | | | 427/256 |
| 6,138,082 | A * | 10/2000 | Wang | G01N 30/62 |
| | | | | 356/325 |
| 6,147,351 | A | 11/2000 | Huiku | |
| 6,822,216 | B2 * | 11/2004 | Lang | G01B 11/272 |
| | | | | 250/221 |
| 7,119,902 | B2 * | 10/2006 | Beaumont | G01N 21/274 |
| | | | | 356/418 |
| 7,808,625 | B2 * | 10/2010 | Nakamura | G02B 21/086 |
| | | | | 356/123 |
| 7,876,442 | B2 * | 1/2011 | Tokunaga | G01N 35/025 |
| | | | | 356/418 |
| 8,436,296 | B2 * | 5/2013 | Ford | G01J 3/02 |
| | | | | 250/269.1 |
| 9,448,215 | B2 * | 9/2016 | Rathke | G01N 21/276 |
| 9,903,964 | B2 * | 2/2018 | Thran | G01T 7/005 |
| 9,915,635 | B1 * | 3/2018 | Warngren | G01N 30/8631 |
| 10,066,992 | B2 * | 9/2018 | Ando | G01J 3/0297 |
| 10,436,709 | B2 * | 10/2019 | Kompaniets | G01N 21/85 |
| 11,262,346 | B2 * | 3/2022 | Yamamoto | G01N 21/82 |
| 11,800,051 | B2 * | 10/2023 | Gooden | G01N 21/274 |
| 11,879,779 | B2 * | 1/2024 | Wheatley | G02B 5/201 |
| 2002/0110376 | A1 * | 8/2002 | MacLean | H04N 25/00 |
| | | | | 396/429 |
| 2006/0017922 | A1 * | 1/2006 | Lewis | G01J 3/524 |
| | | | | 356/243.1 |
| 2008/0259318 | A1 | 10/2008 | Pan | |
| 2009/0302206 | A1 * | 12/2009 | Harris | G01J 1/0418 |
| | | | | 250/252.1 |
| 2019/0049306 | A1 | 2/2019 | Workman, Jr. | |
| 2019/0107436 | A1 * | 4/2019 | Dohi | G01J 3/021 |

FOREIGN PATENT DOCUMENTS

| | | |
|---|---|---|
| CN | 103389199 A | 11/2015 |
| CN | 108204888 A | 4/2020 |
| EP | 2359111 B1 | 10/2017 |
| EP | 3321658 A1 | 5/2018 |
| JP | 06-331541 A | 12/1994 |
| JP | H10153544 A | 6/1998 |

OTHER PUBLICATIONS

GB Search Report for GB2006311.1, mailed Oct. 2, 2020 (2 pages).
JP Office Action for corresponding Japanese Application No. 2022-566441, dated Feb. 25, 2025, 8 pages. (Translation).
EP Office Action in corresponding EP Application 21722795.8, mailed, Jul. 30, 2024 (7 pages).

* cited by examiner

METHOD FOR CALIBRATING AN APPARATUS FOR MEASURING THE ABSORBANCE OF LIGHT BY A SUBSTANCE

CROSS REFERENCE TO RELATED APPLICATIONS

This application claims the priority benefit of PCT/EP2021/060951 filed Apr. 27, 2021, which claims the priority benefit to GB Application No. 2006311.1, filed Apr. 29, 2020.

TECHNICAL FIELD

The present disclosure relates to a method for calibrating devices for measuring the absorbance of light by a substance. In particular, the disclosure relates to apparatus for measuring the absorbance of light by a substance used in a chromatography process.

BACKGROUND

Chromatography is a well-known process for analyzing and preparing chemical mixtures or chemical samples. The sample may typically be suspended in a fluid, referred to as a buffer solution or resin.

In the context of chromatography, apparatuses for measuring the absorbance of light of a substance are used to obtain quantitative measurement of light absorbance and/or light scattering and/or transmission properties. Typically, such apparatuses operate with wavelengths corresponding to visible light, deep ultraviolet light, near-ultraviolet light and near-infrared light.

To ensure reliable measurements, apparatus performance is monitored or calibrated regularly and documented. Calibration of the apparatus comprises comparing the performance of the apparatus to reference performance data, e.g. provided by the manufacturer or a defined standard. This is e.g. required for accredited measurement services, e.g. in accordance with ISO 17025. This is also required to comply with Good Laboratory Practice (GLP).

Calibration of the apparatus may typically involve linear accuracy testing and/or photometric (absorbance) accuracy testing, from hereon referred to as absorbance testing.

An example of a conventional solution can be found in U.S. Pat. No. 9,322,770B2 which requires manual insertion of the filters into the apparatus. A further example of a conventional solution can be found in U.S. Pat. No. 9,279,746B2, which uses pressurized air to change between two different filters.

A drawback with conventional solutions is that manual interaction by a user is required, e.g. by inserting and removing optical filters in the apparatus, e.g. between a light emitter configured to emit light of a particular wavelength along an optical path to a light sensor configured to measure the emitted light. The step of inserting and removing the optical filters is tedious and time consuming, and further may result in varying positioning of the optical filters giving calibration results with low reproducibility.

A further drawback with conventional solutions is that the calibration may be compromised by irregularities of the inserted filter, e.g. dust on a lens of the filter.

Thus, there is a need for an improved method and arrangement for calibrating apparatuses for measuring the absorbance of light of a substance.

OBJECTS OF THE INVENTION

An objective of embodiments of the present invention is to provide a solution which mitigates or solves the drawbacks and problems described above.

SUMMARY OF THE INVENTION

The above and further objectives are achieved by the subject matter described herein. Further advantageous implementation forms of the invention are further defined herein According to a first aspect of the invention, the above mentioned and other objectives are achieved by a computer implemented method performed by a computer configured to calibrate an apparatus for measuring the absorbance of light of a substance for a chromatography system, the apparatus comprising a conduit for enabling a fluid to be measured, a light emitter configured to emit light along an optical path to a light sensor configured to measure the emitted light, the optical path intersecting the conduit, a rotating disc having one or more optical filters, each of the one or more optical filters is arranged with its center passing through the optical path when rotating, an actuator configured to rotate the disc dependent on a control signal, to the method comprising controlling rotation of the disc to a first position where a first filter, of the one or more optical filters, intersects the optical path at a first point, measuring a first light absorption value, controlling rotation of the disc to a second position, different to the first position, where the first filter still intersects the optical path at a second point, measuring a second light absorption value, generating an aggregated light absorption value, calibrating the apparatus by comparing the aggregated light absorption value to a reference light absorption value.

At least one advantage of the first aspect is that the influence of minor defects or particle contamination can be minimized. A further advantage is improved calibration results reproducibility.

According to a second aspect of the invention, the above mentioned and other objectives are achieved by a calibration filter arrangement for calibrating an apparatus for measuring the absorbance of light of a substance, the filter arrangement comprising a disc extending along a plane and being arranged to rotate around a rotational axis and hold one or more optical filters at a first distance along the plane from the rotational axis, a rotational drive unit coupled to the disc and configured to rotate the disc around the rotational axis to predetermined positions in response to received control signals.

According to a second aspect of the invention, the above mentioned and other objectives are achieved by an apparatus for measuring the absorbance of light of a substance for a chromatography apparatus, the apparatus comprising a conduit for enabling a fluid to be measured, a light emitter configured to emit light along an optical path to a light sensor, the light sensor being configured to measure the emitted light, the optical path intersecting a center line of the conduit, a rotating disc having one or more optical filters, each of the one or more optical filters is arranged with its center aligned with the optical path when rotated into the optical path, an actuator configured to rotate the disc between predetermined positions dependent on a control signal, and a computer comprising circuitry, the circuitry comprising a processing circuitry and a memory, said memory comprising instructions executable by said processing circuitry, wherein the computer is communicatively coupled to the apparatus, wherein said computer is configured to perform the method according to the first aspect when the instructions are executed by said processing circuitry.

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

Figure 1:
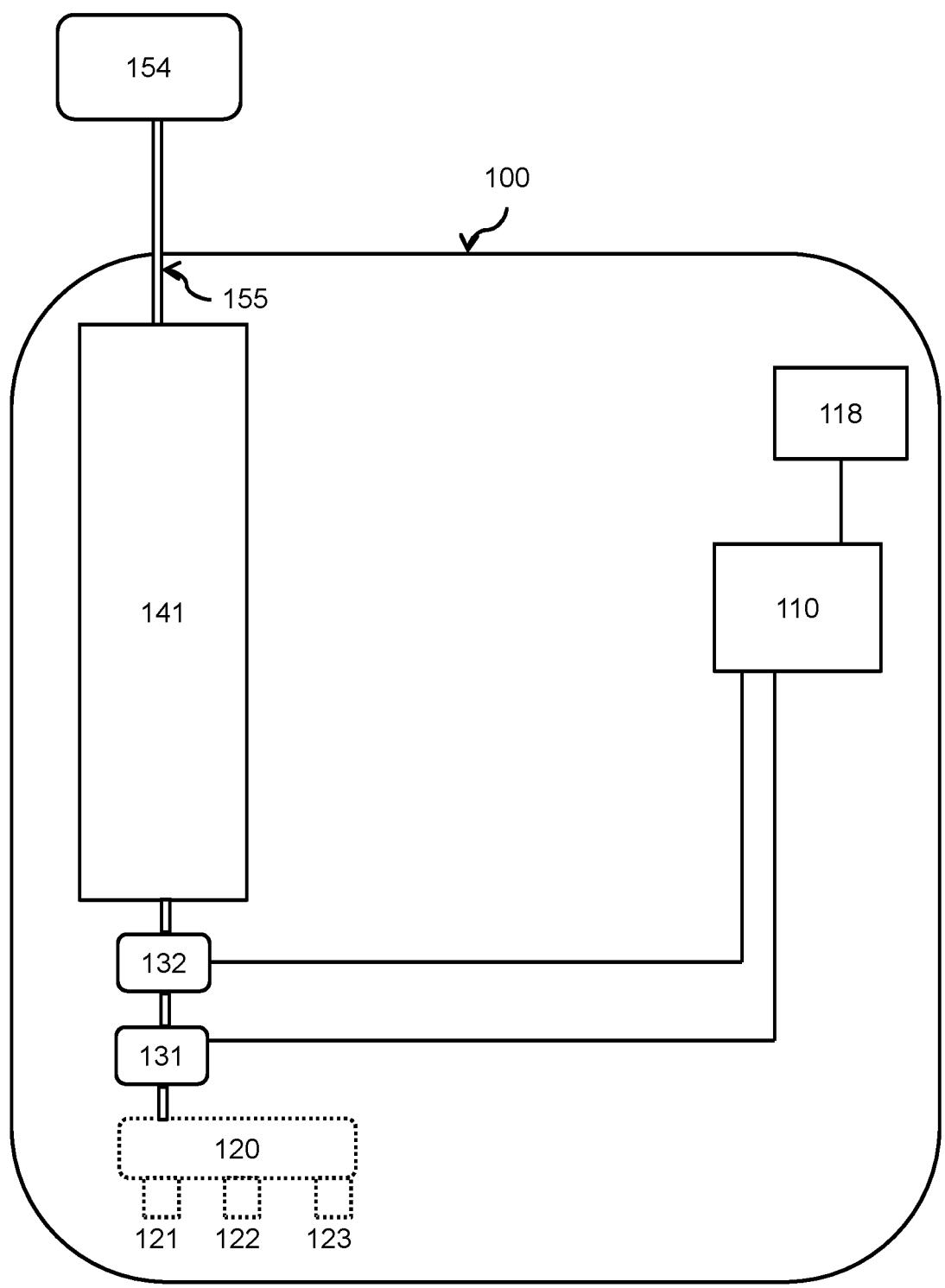
FIG. 1 illustrates a chromatography apparatus according to one or more embodiments of the present disclosure.

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

DETAILED DESCRIPTION

In the present disclosure reference is made to the term apparatus for measuring the absorbance of light by a substance, e.g. an ultraviolet light monitor, a spectrophotometer and/or a spectrophotometry sensor, and denotes electromagnetic spectroscopy resulting in quantitative measurements of light absorbance and/or light scattering and/or light transmission of a material or substance. The wavelengths include visible light, deep-ultraviolet, near-ultraviolet light, and near-infrared light wavelengths. In other words, the ultraviolet light monitor and/or spectrophotometer and/or spectrophotometry sensor can be seen as an apparatus for measuring the absorbance of light by a substance.

In one example, such an apparatus is used to monitor a chromatography process and/or control a chromatography process and/or measure an amount of sample during a chromatography run.

In one further example, such an apparatus is used to monitor a flow filtration process and/or control a flow filtering process. Examples of such filtering processes are crossflow filtration and tangential flow filtration.

As presented in the background section, the disclosure relates to apparatuses for measuring the absorbance of light of a substance in chromatography systems which need to be regularly calibrated to ensure performance and that reliable results are produced.

A drawback with conventional solutions for calibrating such apparatuses is that manual interaction by a user may be required, e.g. by inserting and removing optical filters in the apparatus, e.g. between a light emitter configured to emit light of a particular wavelength along an optical path to a light sensor configured to measure the emitted light. The step of inserting and removing the optical filters is tedious and time consuming, and further may result in varying positioning of the optical filters giving calibration results with low reproducibility.

A further drawback with conventional solutions is that the calibration may be compromised by irregularities of the inserted filter, e.g. dust on a lens of the filter.

An example of a conventional solution can be found in U.S. Pat. No. 9,322,770B2 which requires manual insertion of the filters into the apparatus for measuring the absorbance of light of a substance. A further example of a conventional solution can be found in U.S. Pat. No. 9,279,746B2, which uses pressurized air to change between two different filters.

In one example, certified metal-on-quartz optical filters are commonly used for testing performance of such apparatuses. The apparatus typically comprises a light emitter configured to emit light of a particular wavelength along an optical path to a light sensor configured to measure the emitted light.

Calibration of the apparatus may typically involve accuracy testing, such as linearity or absorbance accuracy testing.

Calibration typically means to characterize the response of the apparatus/spectrophotometer/spectrophotometry sensor. The response may be recorded as a measured light absorbance signal (e.g. on the Y-axis), as a function/curve of a sample concentration in the fluid being analyzed (e.g. on the x-axis). Ideally, this function is linear and follows Lambert-Beer's law. For this, optical filters with pre-determined, certified light absorbance values are used to simulate samples with different concentrations. Linearity testing means to test how well the light absorbance readings of the instrument follow the expected straight line, or how strong the deviation is a at the specified upper limit of the linear dynamic range of the apparatus.

Photometric accuracy testing means more general how accurate a certain instrument can measure a sample with pre-determined reference absorbance (often certified and well within the linear dynamic range).

Also, wavelength accuracy can be calibrated. For this purpose, a filter or substance with pre-determined (often certified) absorbance peaks is used and the absorbance is determined as a function of wavelength. The location of the peaks compared to the location in the certificate is used to proof that the wavelength scale of the UV monitor is correct.

In one example linearity accuracy testing may e.g. involve comparing a quota of measured light intensity over multiple measurement points using a light wavelength, where a light emitter controlled to emit light with a different light intensity and/or optical filters with different attenuation are used. The quota is typically calculated as measured light intensity of a sensor S divided by light intensity measured by a reference sensor RS, as further described in relation to FIG. 2. This will provide an indication of the apparatus performance dependent on the amplitude of measured light. In other words, provide an indication of how well the light intensity measurement results follow a reference curve, e.g. a straight line.

Calibration of the apparatus may additionally or alternatively typically involve photometric (absorbance) accuracy testing or absorbance testing. This may e.g. involve comparing measured light intensity to a reference light intensity. This will provide an indication of the apparatus's absolute performance. In other words, provide an indication if the results comprise an offset, e.g. to reference light absorbance values.

The present solution provides an improved method for calibrating an apparatus for measuring the absorbance of light of a substance. The present solution further provides an improved apparatus for measuring the absorbance of light of a substance.

The present disclosure solves the drawbacks of the conventional solutions by utilizing an actuator, such as a step motor, to rotate a filter wheel with one or more filters having different light absorbance values. The filter wheel may be situated between two lenses along an optical path. The apparatus further comprises a light emitter configured to emit light along the optical path to a light sensor configured to measure the emitted light. In one embodiment, the apparatus further comprises a first lens which collimates the emitted light, e.g. from the optical path comprising an optical fiber connected and/or optically coupled to the light emitter. The apparatus may further comprise a second lens which focuses the collimated light back into the optical path, e.g. to a second optical fiber that is connected to a flow cell. The measured light absorbance results are used for determining photometric accuracy, such as linearity accuracy or linear dynamic range accuracy, of the system or apparatus.

By comparing measured results over time, it can be decided if there is a need for maintenance. I.e. asset performance measurement may be performed. In other words, if the measured absorbance declines over time it may be used as an indication that maintenance is required, e.g. replacing the light emitter, replacing the light sensor, cleaning lenses etc.

The present disclosure is made based on the realization by the inventors that measured results, e.g. of optical absorbance, are not constant when a particular filter of the filter wheel is moved through the optical path. There is a distinct and consistent pattern of the measured absorbance, even if the optics always remains within the free aperture of the filter at all time.

Therefore, it is advantageous to scan and average measured values over different positions for each filter. Another advantage of this approach is that the influence of minor defects or particle contamination can be minimized. The filter wheel can be enclosed into a housing so that the filter assembly is not accessible from the outside and protected against particle or other contamination. The result is a highly repetitive and accurate calibration, e.g. determination of the linearity accuracy or linear dynamic range of the apparatus. The calibration can be performed on demand and without manual interaction with the instrument.

In other words, an improvement of precision and accuracy of measurements compared to technical solutions where each filter is measured at just one position is achieved. The solution also allows for frequent and highly repetitive evaluation of linearity and photometric accuracy performance. This can further be used for predicting the need for maintenance (asset performance management).

An "or" in this description and the corresponding claims is to be understood as a mathematical OR which covers "and" and "or", and is not to be understood as an XOR (exclusive OR). The indefinite article "a" in this disclosure and claims is not limited to "one" and can also be understood as "one or more", i.e., plural.

In the present disclosure reference will be made interchangeably to the terms "fluid source", "container" and "reservoir", signifying denotes a unit or arrangement capable of providing a fluid, e.g. a receptacle suitable for holding fluid. In the following description the fluid source will be described as a container, but any suitable fluid source may be used.

In the present disclosure reference will be made interchangeably to processing circuitry and processing means.

In the present disclosure, the term "buffer solution" denotes a fluid adapted for use with a chromatography apparatus, e.g. used to suspend a sample in before performing a chromatography run.

In the present disclosure, the term "chromatography system" is used interchangeably with the term "chromatography apparatus" and denotes an arrangement or apparatus for separation of a mixture.

In the present disclosure, the term "optical path" denotes a path that light takes when travelling in an optical medium, e.g. open air or an optical fiber.

In the present disclosure, the term "light emitter" denotes a light source capable of emitting light of a particular wavelength, e.g. a flash lamp, a discharge lamp, a light bulb or a Light Emitting Diode, LED. The light is emitted along an optical path.

In the present disclosure, the term "light sensor" denotes an arrangement configured to measure intensity of received light, e.g. a photodiode.

FIG. 1 illustrates a chromatography apparatus 100 according to one or more embodiments of the present disclosure.

The chromatography apparatus 100 may typically comprise at least one inlet 155. The inlet may optionally be coupled to o the generation system SYS and/or a fluid source 154 configured to hold a fluid, e.g. the eluent. The inlet 155 may e.g. be implemented as tubular elements such as a tube or hose. The inlet 155 may be configured to be coupled to a column 141. The column 141 may be comprised in the chromatography apparatus 100 or arranged external to the chromatography apparatus 100.

The chromatography apparatus 100 may further comprise a control unit 110 which comprises circuitry 118, e.g. a processor and a memory. The memory may contain instructions executable by the processing circuitry, whereby said control unit 110 and/or chromatography apparatus is operative to perform any of the steps or methods described herein.

In some embodiments a selection of any of the apparatus 131, the conductivity sensor 132 and the outlet valve 120 are serially and fluidly coupled to the column 141 or fluid source 154 and performs measurements during the whole chromatography run. The chromatography apparatus 100 may optionally comprise a splitter (not shown) coupled to a fluid outlet of the column 141 and coupled to a selection of any of an apparatus for measuring the absorbance of light of a substance/spectrophotometry sensor 131, a conductivity sensor 132 and an outlet valve 120. The splitter may be configured to direct fluid received from the column 141 to any of the apparatus 131, the conductivity sensor 132 and the outlet valve 120. Optionally the splitter may be communicatively coupled to the control unit 110 and perform coupling of fluid to any of the UV sensor 131, the conductivity sensor 132 and the outlet valve 120 in response to one or more control signals from the control unit 110.

The apparatus 131 may be communicatively coupled to the control unit 110 and configured for measuring a quantitative measure, such as light absorbance of the fluid provided by the splitter. The apparatus 131 a may further be configured to provide the measured quantitative measure as control signals comprising measurement data to the control unit 110.

The chromatography apparatus 100 may further comprise a conductivity sensor 132 that optionally is communicatively coupled to the control unit 110 and configured for measuring the quantitative measure, e.g. conductivity of the fluid provided by the splitter. The conductivity sensor 132 may further be configured to provide the measured quantitative measure as control signals comprising measurement data to the control unit 110.

The chromatography apparatus 100 may further comprise an outlet valve 120 coupled to the splitter. The outlet valve 120 may have one or more outlets or outlet ports 121-123 and is configured to provide the fluid provided by the splitter to the one or more outlets 121-123 in response to a control signal, e.g. received from the control unit 110. In other words, performing fractionation of the eluate.

The control unit 110 is communicatively coupled to the apparatus 131 and/or the conductivity sensor 132 and/or outlet valve 120. The control unit 110 is configured to send and/or receive control signals to/from the apparatus 131 and/or the conductivity sensor 132 and/or outlet valve 120.

Figure 2:
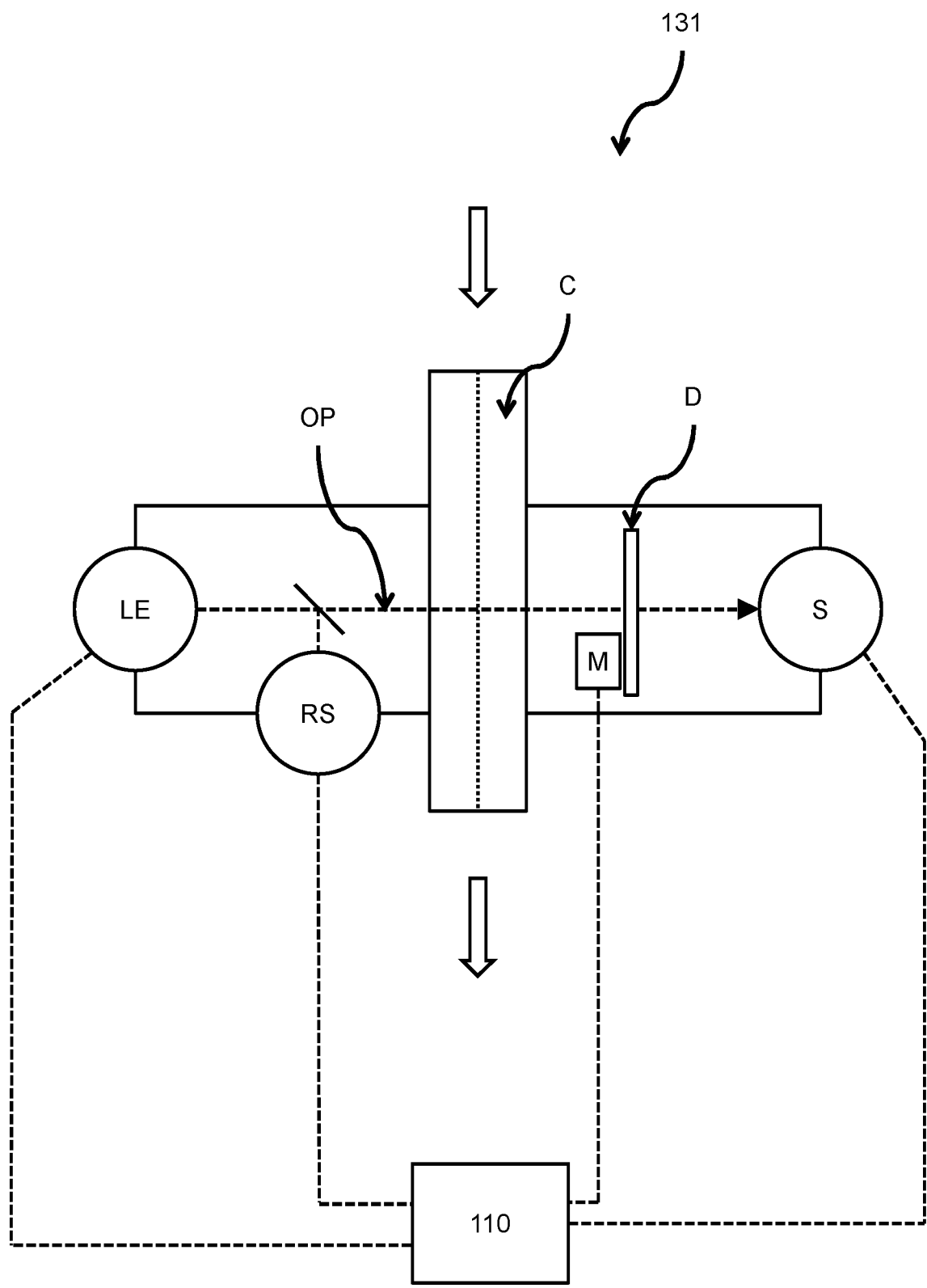
FIG. 2 illustrates an apparatus for measuring the absorbance of light of a substance according to one or more embodiments of the present disclosure.

FIG. 2 illustrates an apparatus/spectrophotometer/spectrophotometry sensor 131 according to one or more embodiments of the present disclosure. The apparatus for measuring the absorbance of light of a substance is typically for a chromatography apparatus 100.

The apparatus 131 typically comprises a conduit C for enabling a fluid to be measured, e.g. to measure light absorbance or transmittance of a fluid processed by the chromatography apparatus 100. The apparatus 131 typically comprises a light emitter LE configured to emit light along an optical path OP to a light sensor S. The light sensor S is configured to measure the emitted light, in particular to measure and/or quantify light intensity of received light. The apparatus 131 further may optionally comprise a reference light sensor RS configured to measure the emitted light, in particular to measure and/or quantify light intensity of received light. The apparatus 131 may further comprise a beam splitter configured to split light from the light emitter LE and divert the emitted light both towards the light sensor S and towards the reference light sensor RS. Thereby, a relative measure of light intensity can be obtained between light intensity before traversing through the conduit C and/or any calibration filter arrangements and light intensity after traversing through the conduit C and/or any calibration filter arrangements, thus providing a measure of light absorbance and/or transmittance.

The light emitter LE and the light sensor S may be arranged such that the optical path intersects the conduit C, e.g. intersects substantially the center line of the conduit C. In other words, the apparatus 131 is typically used to measure absorbance and/or transmittance of light passing through the fluid processed by the chromatography apparatus 100. The light emitter LE is controlled dependent on and/or in response to a received control signal and/or received control signals, e.g. controlled to emit a certain light intensity and/or emit light of a particular bandwidth. The light sensor S is further configured to send a control signal indicative of the measured light. The control signals are typically received from/sent to the control unit/computer 110.

The apparatus 131 typically further comprises a calibration filter arrangement for calibrating the apparatus 131. The filter arrangement comprises a rotating disc D having or being provided with one or more optical filters. The disc is arranged to rotate around a rotational axis, and each of the one or more optical filters is arranged with its center aligned with the optical path OP when rotated into the optical path OP by the disc D. In other words, the rotational axis and the optical path OP run substantially in parallel, and the distance from the rotational axis to the optical path OP is the same as the distance from the rotational axis to the center of each of the optical filters.

The filter arrangement typically further comprises an actuator M configured to rotate the disc D between predetermined positions dependent and/or in response to a received control signal and/or received control signals. The actuator M may e.g. be a stepping motor configured to rotate between predetermined positions. The control signals are typically received from the control unit 110.

Figure 8:
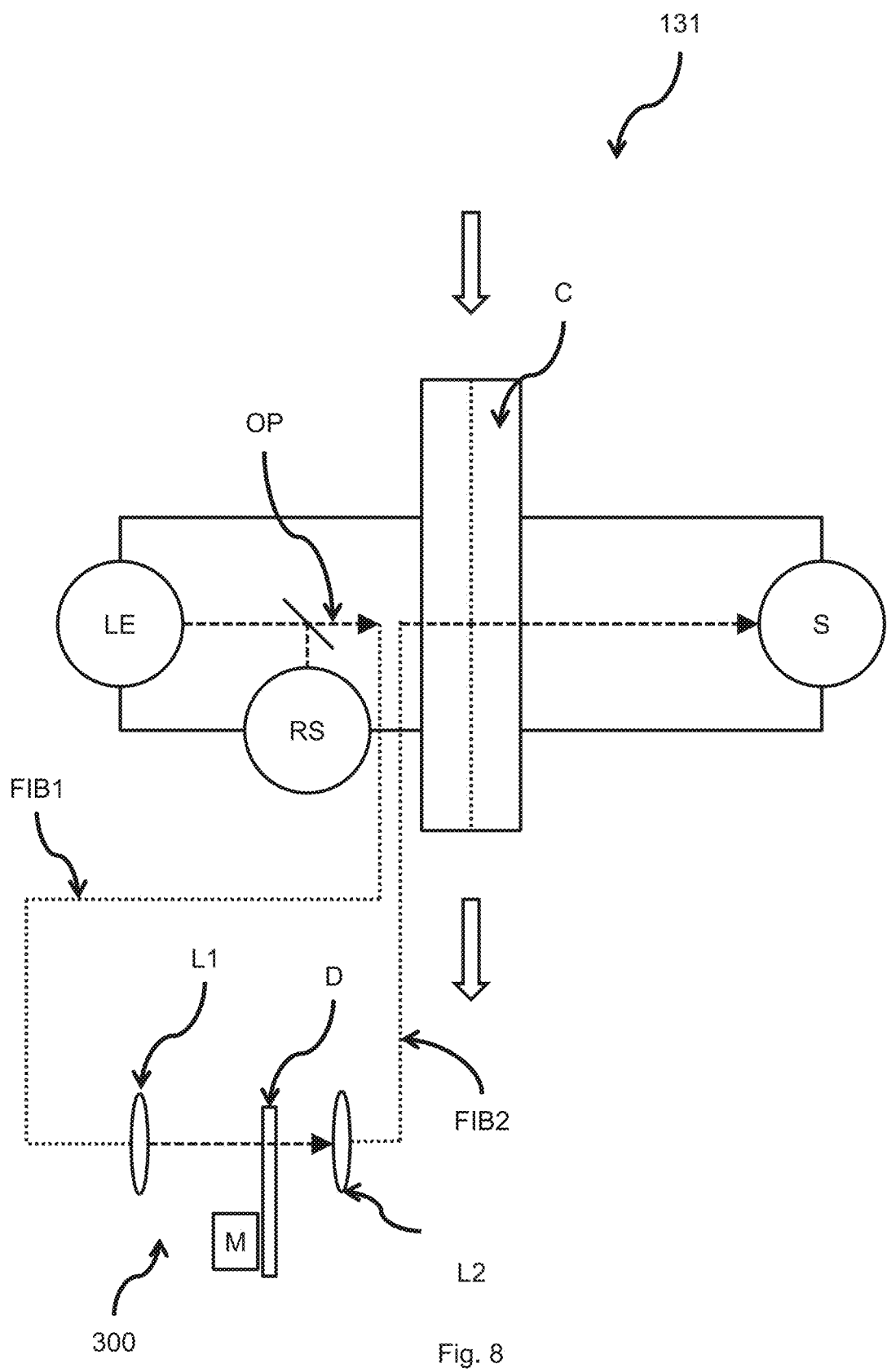
FIG. 8 shows an embodiment of an apparatus for measuring the absorbance of light of a substance provided with an external calibration filter arrangement.

Alternatively, the apparatus 131 is provided with an external calibration filter arrangement 300 as further described in relation to FIG. 8.

The apparatus 131 is further communicatively coupled to the control unit 110, e.g. to a selection of the light emitter LE, the light sensor S, the reference light sensor RS and the actuator M.

Figure 6:
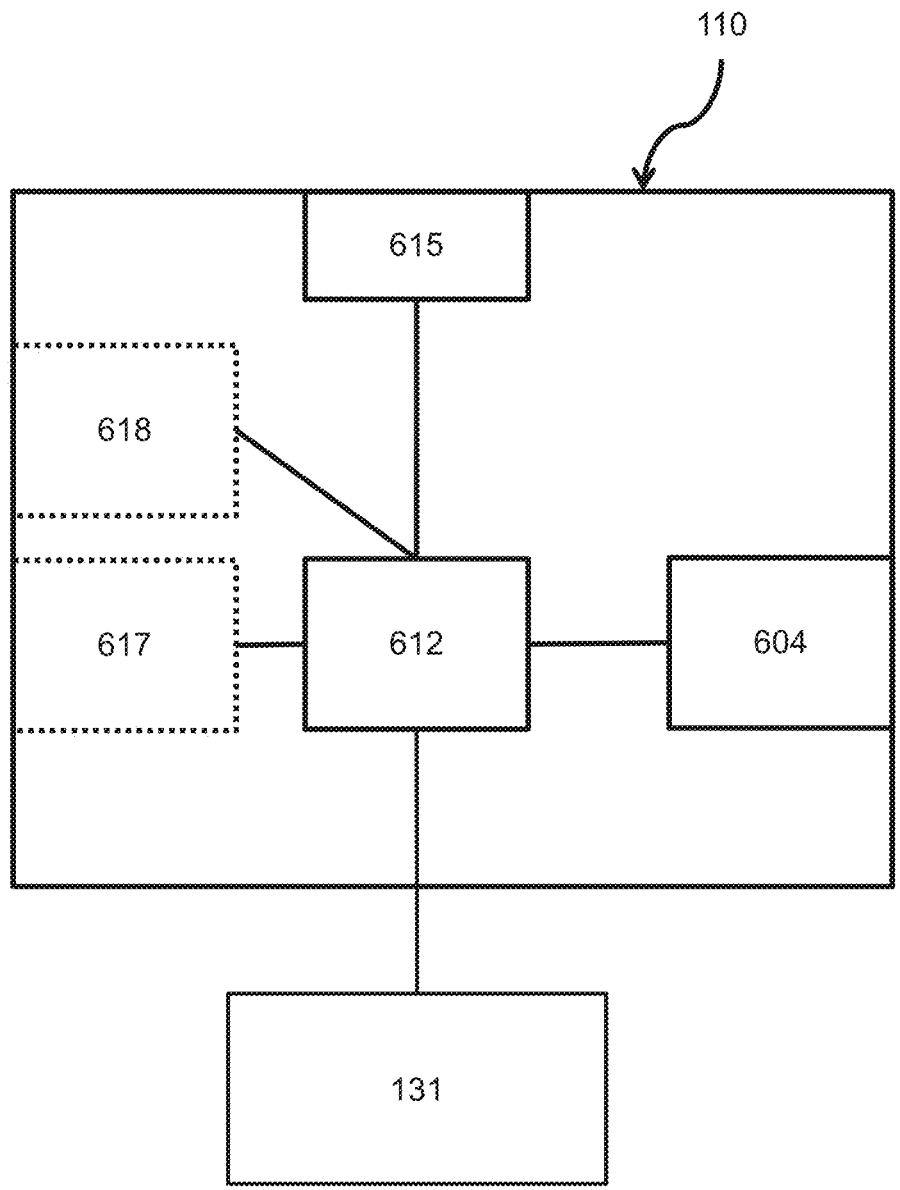
FIG. 6 shows a computer/control unit according to one or more embodiments of the present disclosure.

The control unit 110 and/or computer 110 is further described in relation to FIG. 6.

Figure 3:
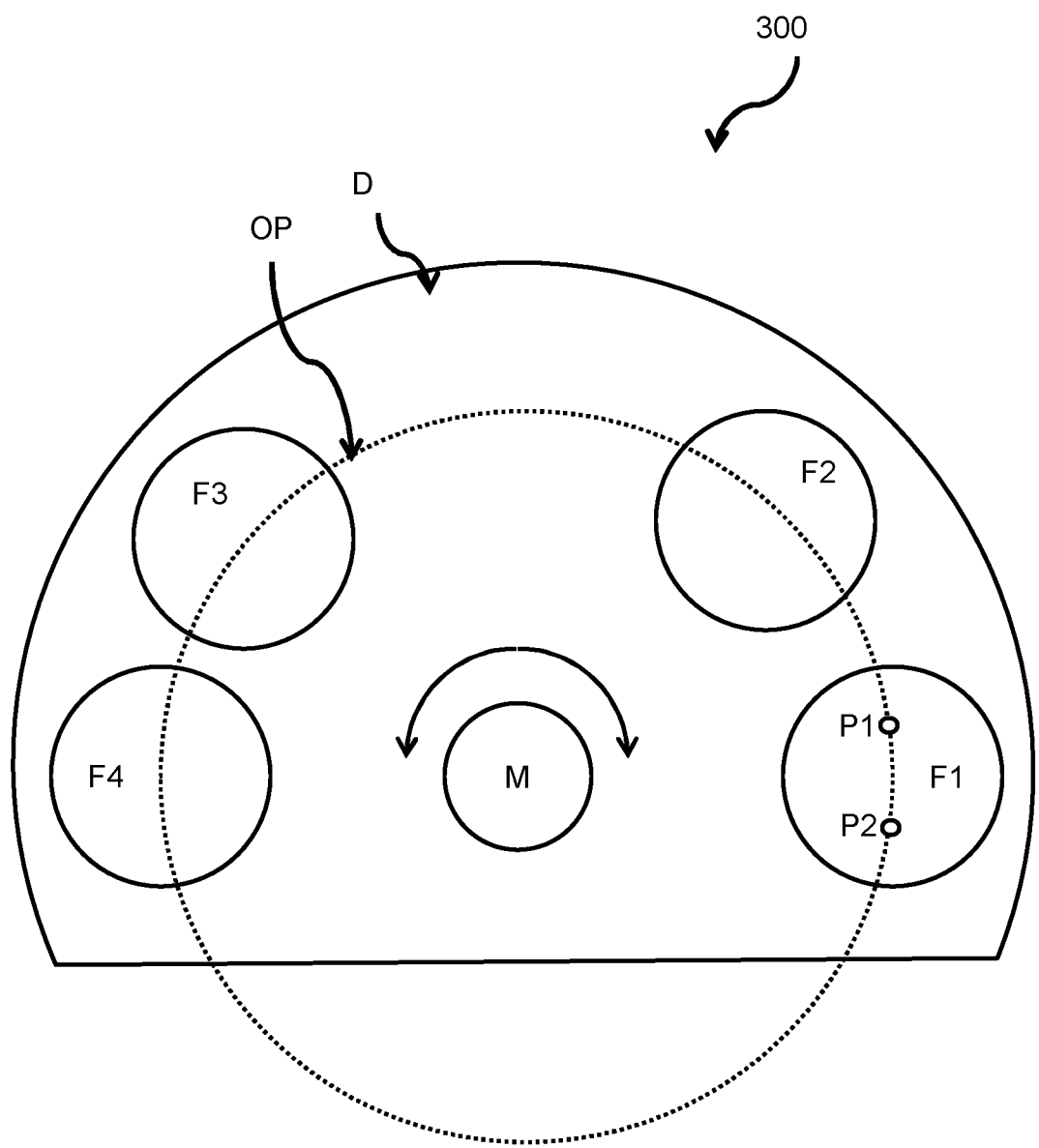
FIG. 3 shows details of a calibration filter arrangement according to one or more embodiments of the present disclosure.

FIG. 3 shows details of the calibration filter arrangement 300 according to one or more embodiments of the present disclosure. The filter arrangement 300 is shown seen from the direction of the optical path OP, i.e. from the light emitter LE to the light sensor S.

The filter arrangement 300 comprises a disc D extending along a plane and being arranged to rotate around the rotational axis and configured to hold one or more optical filters F1-F4. The one or more optical filters F1-F4 are held or retained at a first distance D1 along the plane from the rotational axis.

In other words, the filter arrangement comprises the rotating disc D having or being provided with one or more optical filters F1-F4. The disc D is arranged to rotate around the rotational axis, and each of the one or more optical filters F1-F4 is arranged with its center aligned with the optical path OP when rotated into the optical path OP by the disc D.

The filter arrangement 300 further comprises an actuator or rotational drive unit M coupled to the disc D and configured to rotate the disc D around the rotational axis to predetermined positions in response to received control signals. The control signals are typically received from the control unit 110.

In other words, the filter arrangement typically further comprises an actuator M configured to rotate the disc D between predetermined positions dependent and/or in response to a received control signal and/or received control signals. The actuator M may e.g. be a stepping motor configured to rotate between predetermined positions. The control signals are typically received from the control unit 110.

The positions where the optical path is intersected by the disc D, as the disc D rotates, is indicated by the dotted circle in FIG. 3. In other words, the positions where the optical path aligns with filters comprised by the disc D, as the disc D rotates, is indicated by the dotted circle in FIG. 3. In other words, the rotational axis and the optical path OP run substantially in parallel, and the distance from the rotational axis to the optical path OP is the same as the distance from the rotational axis to the center of each of the optical filters.

The disc D comprises a shape of a circular segment or a semicircle. Thus, in some positions the disc does not overlap with or intersects the optical path OP.

Figure 4:
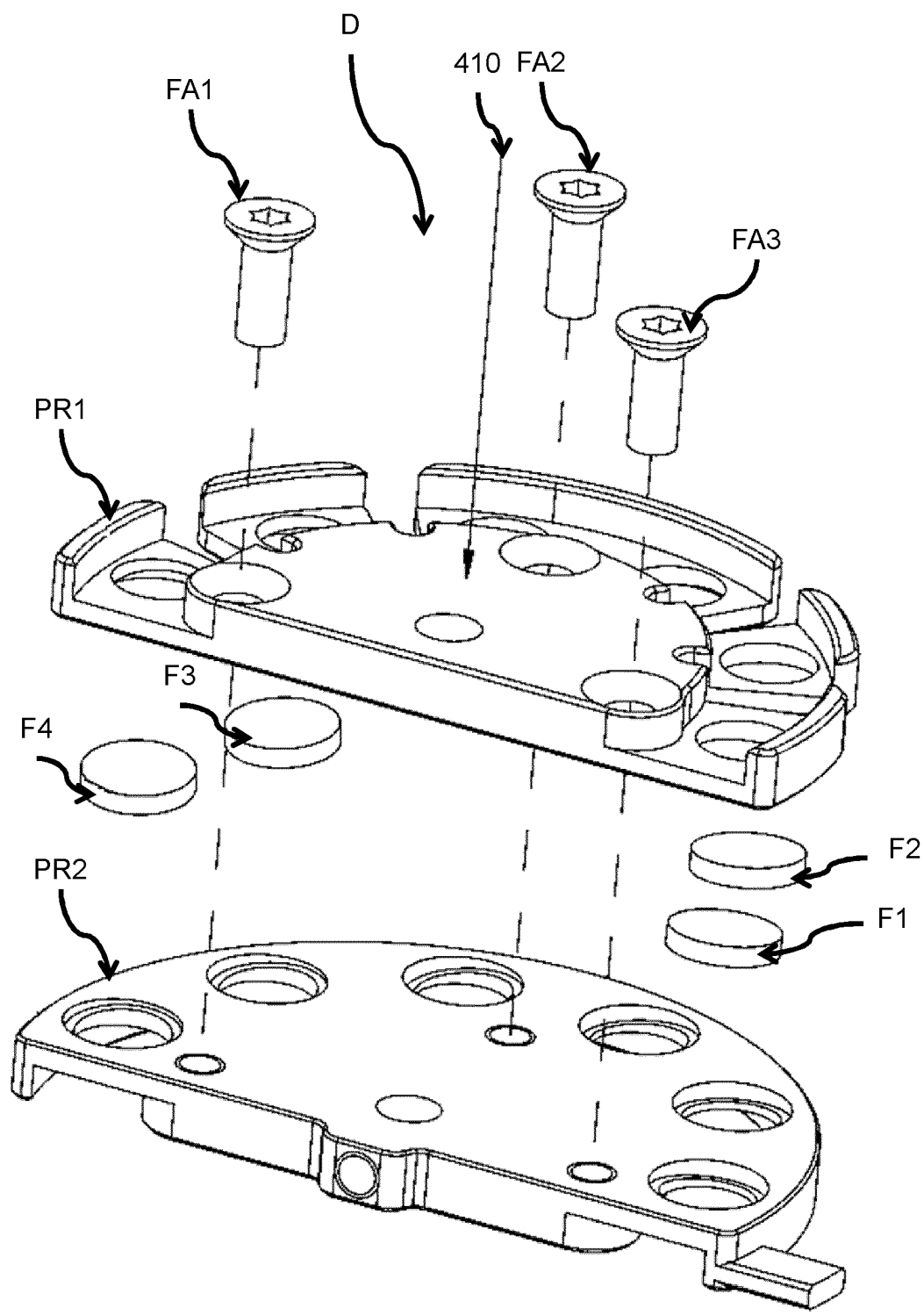
FIG. 4 shows a disc comprising multiple parts according to one or more embodiments of the present disclosure.

FIG. 4 shows a disc D comprising multiple parts according to one or more embodiments of the present disclosure. The disc D is extending along a plane and being arranged to rotate around a rotational axis 410 and hold one or more optical filters F1-F4. The one or more optical filters F1-F4 are held by the disc at a first distance D1 along the plane from the rotational axis 410, typically arranged to match the distance between the rotational axis 410 and the optical path OP (not shown in the figure).

In one or more embodiments, the disc D comprises a shape of a circular segment or a semicircle. This means that when the disc D, rotates around the rotational axis 410 for a full revolution either the disc or the one or more optical filters F1-F4 are blocking or intersecting the optical path OP for one part of the revolution and not blocking or intersecting the optical path OP for a second part of the revolution.

In one or more embodiments, the disc D comprises a first part PR1, a second part PR2, one or more filters F1-F4, one or more fastening arrangements FA1-FA3 configured to secure the first part PR1 to the second part PR2. The first part PR1 and the second part PR2 are arranged on opposing sides of the plane and one or more filters F1-F4 are arranged along the plane.

The fastening arrangements may e.g. be screws holding the first part PR1 to the second part PR2.

Figure 5:
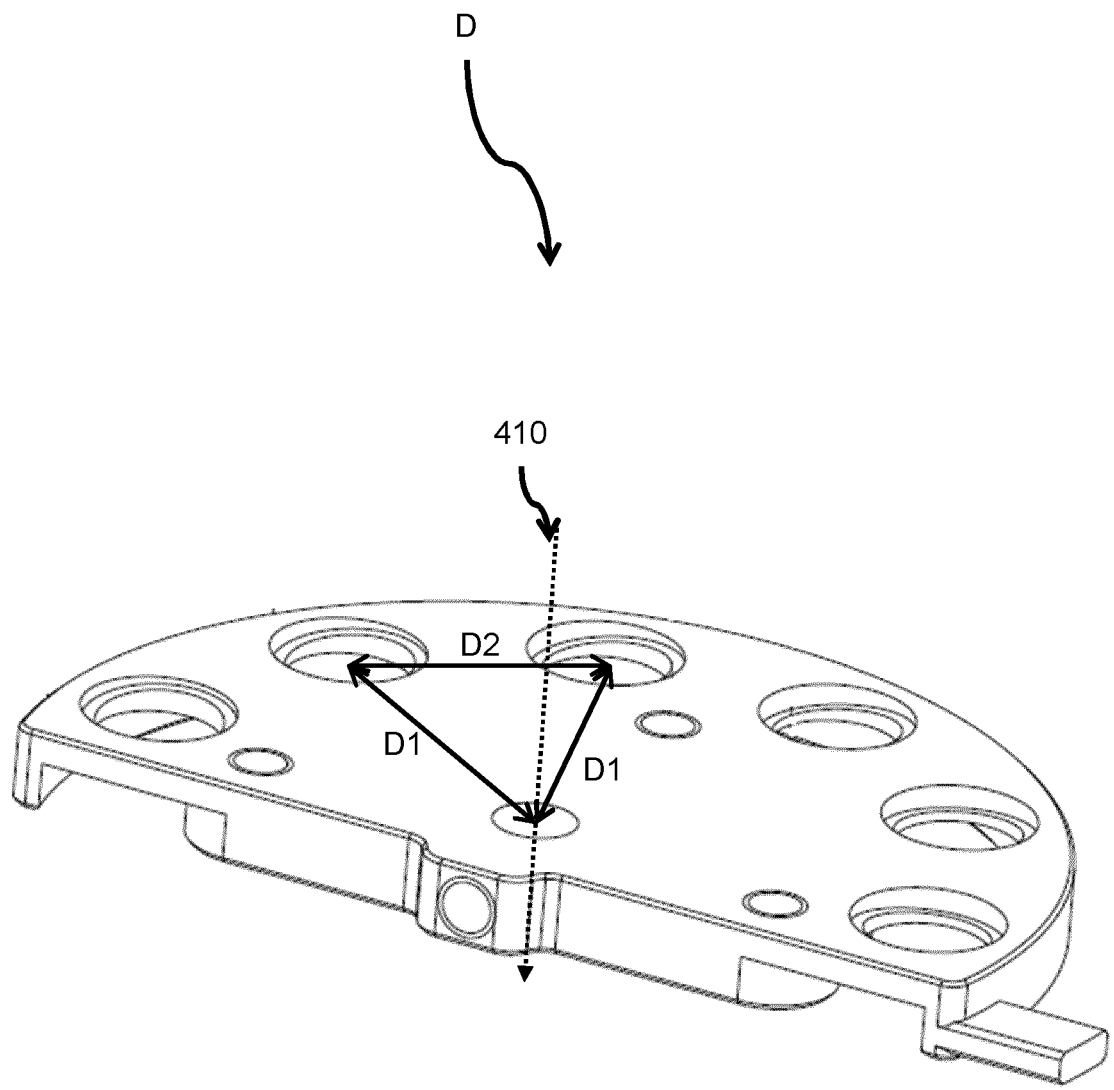
FIG. 5 shows details of a disc according to one or more embodiments of the present disclosure.

FIG. 5 shows details of a disc D according to one or more embodiments of the present disclosure. The one or more optical filters F1-F4 are typically arranged with their center at the first distance D1, along the plane, from the rotational axis 410. The one or more optical filters F1-F4 are further arranged at a particular distance from each other. In one embodiment, the one or more optical filters F1-F4 are separated by each other by a second distance D2. In one example, the one or more optical filters F1-F4 are arranged with their centers at equal distances from each other.

FIG. 6 shows the computer/control unit 110 according to one or more embodiments of the present disclosure. The computer 110 may be in the form of e.g. a computer, a server, a control unit, an on-board computer, a stationary computing device, a laptop computer, a tablet computer, a handheld computer, a wrist-worn computer, a smart watch, a smartphone or a smart TV. The computer 110 may comprise processing circuitry 612 communicatively coupled to a communication interface, e.g. a transceiver, 604 configured for wired or wireless communication. The computer 110 may further comprise at least one optional antenna (not shown in figure). The antenna may be coupled to the transceiver 604 and is configured to transmit and/or emit and/or receive wired or wireless signals in a communication network, such as WiFi, Bluetooth, 3G, 4G, 5G wireless networks etc. In one example, the processing circuitry 612 may be any of a selection of processing circuitry and/or a central processing unit and/or processor modules and/or multiple processors configured to cooperate with each-other. Further, the computer 110 may further comprise a memory 615. The memory 615 may e.g. comprise a selection of a hard RAM, disk drive, a floppy disk drive, a flash drive or other removable or fixed media drive or any other suitable memory known in the art. The memory 615 may contain instructions executable by the processing circuitry to perform any of the steps or methods described herein. The processing circuitry 612 may optionally be communicatively coupled to a selection of any of the transceiver 604 and/or the memory 615. The computer 110 may be configured to send/receive control signals directly to any of the above mentioned units or to external nodes or to send/receive control signals via the wired and/or wireless communications network.

The wired/wireless transceiver 604 and/or a wired/wireless communications network adapter may be configured to send and/or receive data values or parameters as a signal to or from the processing circuitry 612 to or from other external nodes. E.g. measured values indicative of measured light intensity.

In an embodiment, the transceiver 604 communicates directly to external nodes or via the wireless communications network.

In one or more embodiments the computer 110 may further comprise an input device 617, configured to receive input or indications from a user and send a user input signal indicative of the user input or indications to the processing circuitry 612.

In one or more embodiments the computer 110 may further comprise a display 618 configured to receive a display signal indicative of rendered objects, such as text or graphical user input objects, from the processing circuitry 612 and to display the received signal as objects, such as text or graphical user input objects.

In one embodiment the display 618 is integrated with the user input device 617 and is configured to receive a display signal indicative of rendered objects, such as text or graphical user input objects, from the processing circuitry 612 and to display the received signal as objects, such as text or graphical user input objects, and/or configured to receive input or indications from a user and send a user-input signal indicative of the user input or indications to the processing circuitry 612.

In a further embodiment, the computer 110 may further comprise and/or be coupled to one or more additional sensors (not shown in the figure) configured to receive and/or obtain and/or measure physical properties pertaining to the chromatography apparatus 100 and send one or more sensor signals indicative of the physical properties of the chromatography apparatus 100 to the processing circuitry 612. E.g. a temperature sensor measuring ambient air temperature.

In one or more embodiments, the processing circuitry 612 is further communicatively coupled to the input device 617 and/or the display 618 and/or the additional sensors and/or any of the units described herein.

Figure 7:
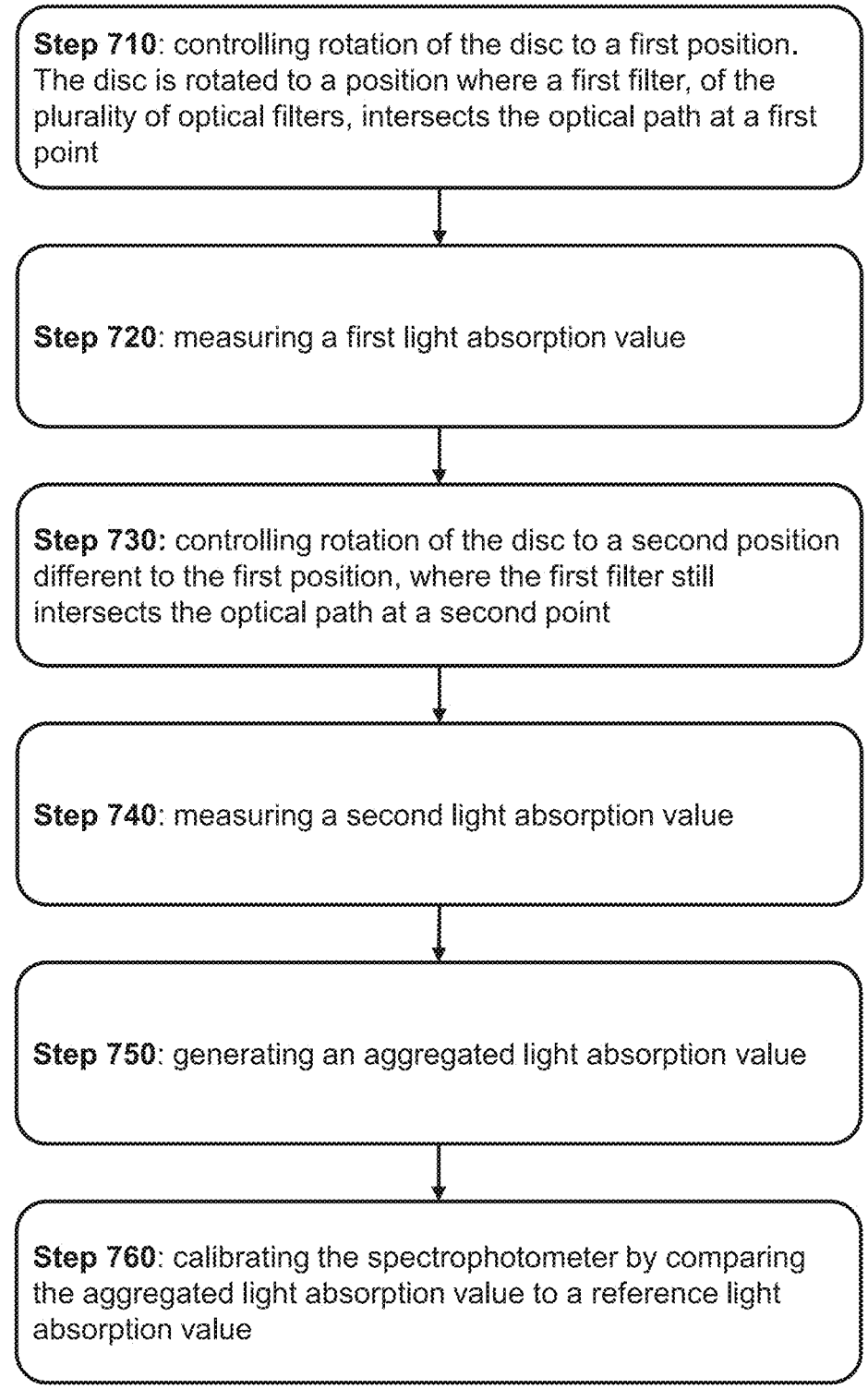
FIG. 7 shows a flowchart of a method according to one or more embodiments of the present disclosure.

FIG. 7 shows a flowchart of a method according to one or more embodiments of the present disclosure. The method may be a computer implemented method performed by the computer 110 configured to calibrate an apparatus/spectrophotometer 131 for measuring the absorbance of light of a substance for a chromatography system or chromatography apparatus 100. The apparatus 131 may comprise a conduit C for enabling a fluid to be measured. The apparatus 131 may further comprise a light emitter LE configured to emit light along an optical path OP to a light sensor S configured to measure the emitted light. The optical path may e.g. intersect a center line of the conduit C. The apparatus 131 may further comprise a rotating disc D having one or more optical filters, each of the plurality of optical filters arranged with its center passing through the optical path OP when rotating, an actuator configured to rotate the disc D dependent on a control signal. The method comprising:

Step 710: controlling rotation of the disc D to a first position. The disc is rotated to a position where a first filter, of the one or more optical filters, intersects the optical path OP at a first point P1.

The optical filter intersects the optical path in the sense that the optical filter is placed or arranged in a position where the optical path passes through the optical filter such that a (often predetermined) light attenuation of the emitted light can be recorded by the light sensor S.

In a first example, with reference to FIG. 3, a filter F1 is rotated to a position where the optical path passes through the optical filter at a first point P1.

The disc D is typically controlled to the first position by the computer 110, by sending a control signal to the drive unit/actuator M.

Step 720: measuring a first light absorption value.

In an example, with reference to FIG. 2, firstly a reference light intensity value is recorded/measured by the reference sensor RS, the reference light intensity value being indicative of light intensity of light emitted by the light emitter LE. Secondly, and substantially simultaneously, a received light intensity value is recorded/measured by the light sensor S. The computer 110 may then measure/calculate the first light absorption value as a quota between the received light intensity value and the reference light intensity value.

Step 730: controlling rotation of the disc D to a second position different to the first position, where the first filter still intersects the optical path OP at a second point P2.

The disc D is typically controlled to the second position by the computer 110, by sending a control signal to the drive unit/actuator M. In one example, the drive unit/actuator M is a stepping motor that moves to predetermined position in response to the control signal. The stepping motor may e.g. have 200 predetermined positions/steps per resolution, and rotate 1.8 degrees for each full step between the predetermined positions.

Step 740: measuring a second light absorption value.

In an example, with reference to FIG. 2, firstly a second reference light intensity value is recorded/measured by the reference sensor RS, the second reference light intensity value being indicative of light intensity of light emitted by the light emitter LE. Secondly, and substantially simultaneously, a second received light intensity value is recorded/measured by the light sensor S. The computer 110 may then measure/calculate the second light absorption value as a quota between the second received light intensity value and the second reference light intensity value.

Step 750: generating an aggregated light absorption value.

In one embodiment, the aggregated light absorption value is generated by calculating an average value using the first light absorption value and the second light absorption value.

In one example, the aggregated light absorption value is generated by calculating an arithmetic mean value of the first light absorption value and the second light absorption value.

In one embodiment, the average value is calculated as a selection of arithmetic mean, geometric mean and harmonic mean.

Even though, the principle of generating an aggregated light absorption value is illustrated by aggregating light absorption value at two different points, It is understood that a larger number of values, such as 3-50, may be used without departing from the present disclosure.

Step 760: calibrating the apparatus 131 by comparing the aggregated light absorption value to a reference light absorption value.

In one embodiment, calibrating comprises performing absorbance accuracy testing by comparing the aggregated light absorption value to a reference light absorption value, wherein comparing comprises calculating an absolute difference between the aggregated light absorption value and the reference light absorption value.

In one embodiment, calibrating comprises performing linearity accuracy testing by generating a plurality of aggregated light absorption values, each aggregated light absorption value generated for a different amplitude of emitted light/different optical filter, comparing the plurality of aggregated light absorption values to a reference light absorption curve, wherein comparing comprises calculating absolute differences between each of the plurality of aggregated light absorption values and light absorption values of the curve at corresponding amplitudes and/or using corresponding optical filters. This may e.g. be performed by comparing the plurality of aggregated light absorption values to a straight line.

According to a further aspect of the disclosure, a computer program is provided and comprising computer-executable instructions for causing a computer 110 when the computer-executable instructions are executed on processing circuitry comprised in the computer 110 to perform any of the method steps according described herein.

According to a further aspect of the disclosure, a computer program product is provided comprising a computer-readable storage medium, the computer-readable storage medium having the computer program described above embodied therein.

According to a further aspect of the disclosure, a carrier is provided and containing the computer program described above, wherein the carrier is one of an electronic signal, optical signal, radio signal, or computer readable storage medium.

In one embodiment, the disc D is extending along a plane and rotating around a rotational axis perpendicular to the plane, and wherein the first point P1 and the second point P2 are located in the plane and at a first equal distance from the rotational axis and at a second distance from each other.

In one embodiment, the second distance is in the range of 1-1000 mm.

According to some aspects of the present disclosure, a calibration filter arrangement is provided. The calibration filter arrangement 300 is suitable for calibrating an apparatus for measuring the absorbance of light of a substance/spectrophotometer 131.

The calibration filter arrangement 300 comprising a disc D extending along a plane and being arranged to rotate around a rotational axis 410 and hold one or more optical filters F1-F4 at a first distance D1 along the plane from the rotational axis 410, a rotational drive unit M coupled to the disc D and configured to rotate the disc D around the rotational axis to predetermined positions in response to received control signals.

The rotational drive unit M may e.g. be an electric stepping motor configured to rotate to one of a plurality of predetermined positions.

In one embodiment, the disc D comprises a shape of a circular segment or a semicircle.

In one embodiment, the filter arrangement comprises a disc D, where the disc comprises a first part PR1 and/or a second part PR2 and/or one or more filters F1-F4.

The disc D may further comprise one or more fastening arrangements FA1-FA3 configured to secure the first part PR1 to the second part PR2. The first part PR1 and the second part PR2 arranged on opposing sides of the plane, and, wherein the one or more filters F1-F4 are arranged along the plane.

According to some aspects of the present disclosure, an apparatus for measuring the absorbance of light of a substance, such as a spectrophotometer, 131 is provided. The apparatus 131 is typically for a chromatography apparatus 100. The apparatus 131 comprises a conduit C for enabling a fluid to be measured, a light emitter LE configured to emit light along an optical path OP to a light sensor S, the light sensor S being configured to measure the emitted light. Optionally, the optical path intersects a center line of the conduit C.

The apparatus 131 further comprises a rotating disc D having one or more optical filters F1-F4. Each of the one or more optical filters is typically arranged with its center aligned with the optical path OP when rotated into the optical path OP. In other words, when the disc D rotates the center of the one or more optical filters F1-F4 will in some positions coincide with the optical path OP.

The apparatus 131 further comprises an actuator M configured to rotate the disc D between predetermined positions dependent on a control signal.

The apparatus 131 further comprises and/or is communicatively coupled to a computer 110 comprising circuitry, the circuitry comprising a processing circuitry 612 and a memory 615, said memory 615 comprising instructions executable by said processing circuitry 612, wherein the computer 110 is communicatively coupled to the apparatus 131, wherein said computer is configured to perform any of the method steps described herein when the instructions are executed by said processing circuitry 612.

FIG. 8 shows an embodiment of an apparatus for measuring the absorbance of light of a substance 131 provided with an external calibration filter arrangement 300. As can be seen from FIG. 8, the optical path of the apparatus 131 further comprises a first optical fiber FIB1 configured to optically couple the light emitter LE to the optical filter/s F1-F4. In one example the first optical fiber FIB1 couples light from a beam splitter, configured to split the light from LE, to a first lens L1. The first lens L1 is configured to collimate the light from the first optical fiber FIB1 along the optical path towards the disc/D and/or filter F1-F4. the optical path of the apparatus 131 further comprises a second optical fiber FIB2 configured to optically couple the filtered light to the light sensor S. In one further example, second optical fiber FIB2 couples light that has been filtered by one of the optical filters F1-F4 from a second lens L2 to the light sensor S. The second lens L2 is configured to focus filtered light or light that has passed through one of the filters F1-F4 into the second optical fiber FIB2.

Thus, the calibration filter arrangement 300 can optionally be arranged as an integrated part of the apparatus 131 or as an external part optically coupled to the apparatus 131.

In embodiments, the communications network communicate using wired or wireless communication techniques that may include at least one of a Local Area Network (LAN), Metropolitan Area Network (MAN), Global System for Mobile Network (GSM), Enhanced Data GSM Environment (EDGE), Universal Mobile Telecommunications System, Long term evolution, High Speed Downlink Packet Access (HSDPA), Wideband Code Division Multiple Access (W-CDMA), Code Division Multiple Access (CDMA), Time Division Multiple Access (TDMA), Bluetooth®, Zigbee®, Wi-Fi, Voice over Internet Protocol (VoIP), LTE Advanced, IEEE802.16m, WirelessMAN-Advanced, Evolved High-Speed Packet Access (HSPA+), 3GPP Long Term Evolution (LTE), Mobile WiMAX (IEEE 802.16e), Ultra Mobile Broadband (UMB) (formerly Evolution-Data Optimized (EV-DO) Rev. C), Fast Low-latency Access with Seamless Handoff Orthogonal Frequency Division Multiplexing (Flash-OFDM), High Capacity Spatial Division Multiple Access (iBurst®) and Mobile Broadband Wireless Access (MBWA) (IEEE 802.20) systems, High Performance Radio Metropolitan Area Network (HIPERMAN), Beam-Division Multiple Access (BDMA), World Interoperability for Microwave Access (Wi-MAX) and ultrasonic communication, etc., but is not limited thereto.

Moreover, it is realized by the skilled person that the computer 110 may comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processing circuitry and/or processing means of the present disclosure may comprise one or more instances of processing circuitry, processor modules and multiple processors configured to cooperate with each-other, Central Processing Unit (CPU), a processing unit, a processing circuit, a processor, an Application Specific Integrated Circuit (ASIC), a microprocessor, a Field-Programmable Gate Array (FPGA) or other processing logic that may interpret and execute instructions. The expression "processing circuitry" and/or "processing means" may thus represent a processing circuitry comprising a plurality of processing circuits, such as, e.g., any, some or all of the ones mentioned above. The processing means may further perform data processing functions for inputting, outputting, and processing of data comprising data buffering and device control functions, such as user interface control, or the like.

Finally, it should be understood that the invention is not limited to the embodiments described above, but also relates to and incorporates all embodiments within the scope of the appended independent claims.

The invention claimed is:

1. A computer implemented method performed by a computer configured to calibrate an apparatus for measuring absorbance of light of a substance for a chromatography system, the apparatus comprising a conduit for enabling a fluid to be measured, a light emitter configured to emit light along an optical path to a light sensor configured to measure the emitted light, the optical path intersecting the conduit, a rotating disc having one or more optical filters, each of the one or more optical filters is arranged with its center passing through the optical path when rotating, an actuator configured to rotate the disc dependent on a control signal, the method comprising:
controlling rotation of the disc to a first position where a first filter, of the one or more optical filters, intersects the optical path at a first point,
measuring a first light absorption value,
controlling rotation of the disc to a second position, different to the first position, where the first filter still intersects the optical path at a second point,
measuring a second light absorption value,
generating an aggregated light absorption value, and
calibrating the apparatus by comparing the aggregated light absorption value to a reference light absorption value.

2. The method according to claim 1, wherein calibrating comprises performing absorbance accuracy testing by comparing the aggregated light absorption value to the reference light absorption value, wherein comparing comprises calculating an absolute difference between the aggregated light absorption value and the reference light absorption value.

3. The method according to claim 1, wherein calibrating comprises performing linearity accuracy testing by:
   generating a plurality of aggregated light absorption values, each aggregated light absorption value generated for a different amplitude of emitted light,
   comparing the plurality of aggregated light absorption values to a reference light absorption curve, wherein comparing comprises calculating absolute differences between each of the plurality of aggregated light absorption values and light absorption values of the curve at corresponding amplitudes.

4. The method according to claim 1, wherein the aggregated light absorption value is generated by calculating an average value using the first light absorption value and the second light absorption value.

5. The method according to claim 4, wherein the average value is calculated as a selection of arithmetic mean, geometric mean and harmonic mean.

6. The method according to claim 1, wherein the disc is extending along a plane and rotating around a rotational axis perpendicular to the plane, and wherein the first point and the second point are located in the plane and at a first equal distance from the rotational axis and at a second distance from each other.

7. The method according to claim 6, wherein the second distance is in a range of 1-1000 mm.

* * * * *